(12) United States Patent
Baldwin

(10) Patent No.: US 6,377,266 B1
(45) Date of Patent: Apr. 23, 2002

(54) BIT BLT WITH MULTIPLE GRAPHICS PROCESSORS

(75) Inventor: David Robert Baldwin, Surrey (GB)

(73) Assignee: 3Dlabs Inc., Ltd., Surrey (GB)

( * ) Notice: Subject to any disclaimer, the term of this patent is extended or adjusted under 35 U.S.C. 154(b) by 0 days.

(21) Appl. No.: 09/133,744

(22) Filed: Aug. 13, 1998

Related U.S. Application Data

(60) Provisional application No. 60/066,672, filed on Nov. 26, 1997.

(51) Int. Cl.[7] ................................................. G06T 1/20
(52) U.S. Cl. ........................................ 345/506; 345/536
(58) Field of Search ............................... 345/502, 505, 345/506, 507–509, 520, 523–525, 521, 530, 531, 561–563, 536; 709/216, 246

(56) References Cited

U.S. PATENT DOCUMENTS

| | | | |
|---|---|---|---|
| 5,594,854 A | 1/1997 | Baldwin et al. ............ 345/441 |
| 5,712,664 A * | 1/1998 | Reddy ........................ 345/516 |
| 5,764,243 A | 6/1998 | Baldwin ..................... 345/506 |
| 5,777,629 A | 7/1998 | Baldwin ..................... 345/506 |
| 5,798,770 A | 8/1998 | Baldwin ..................... 345/506 |
| 5,841,444 A * | 11/1998 | Mun et al. .................. 345/506 |
| 5,917,502 A * | 6/1999 | Kirkland et al. ............ 345/505 |

\* cited by examiner

Primary Examiner—Kee M. Tung
(74) Attorney, Agent, or Firm—Groover & Associates; Robert Groover

(57) ABSTRACT

A graphics system using multiple processors which is able to fully support multi-processor operation using only PCI read operations between processors. Each of the graphics processors performs its operations on its respective scanlines, and writes to its own framebuffer, but the need for writes from one processor to the framebuffer of another processor is eliminated.

23 Claims, 3 Drawing Sheets

BIT BLT WITH MULTIPLE GRAPHICS PROCESSORS

This application claim benefit to provisional 60/066,672 filed Nov. 26, 1997.

BACKGROUND AND SUMMARY OF THE INVENTION

Computer Graphics and Rendering

Modern computer systems normally manipulate graphical objects as high-level entities. For example, a solid body may be described as a collection of triangles with specified vertices, or a straight line segment may be described by listing its two endpoints with three-dimensional or two-dimensional coordinates. Such high-level descriptions are a necessary basis for high-level geometric manipulations, and also have the advantage of providing a compact format which does not consume memory space unnecessarily.

Such higher-level representations are very convenient for performing the many required computations. For example, ray-tracing or other lighting calculations may be performed, and a projective transformation can be used to reduce a three-dimensional scene to its two-dimensional appearance from a given viewpoint. However, when an image containing graphical objects is to be displayed, a very low-level description is needed. For example, in a conventional CRT display, a "flying spot" is moved across the screen (one line at a time), and the beam from each of three electron guns is switched to a desired level of intensity as the flying spot passes each pixel location. Thus at some point the image model must be translated into a data set which can be used by a conventional display. This operation is known as "rendering." In general, this application refers to rendering as the processes which include rasterization and following steps.

The graphics-processing system typically interfaces to the display controller through a "frame store" or "frame buffer" of special two-port memory, which can be written to randomly by the graphics processing system, but also provides the synchronous data output needed by the video output driver. (Digital-to-analog conversion is also provided after the frame buffer.) Such a frame buffer is usually implemented using SDRAM or SGRAM memory chips (or sometimes with VRAM or DRAM and special controllers). This interface relieves the graphics-processing system of most of the burden of synchronization for video output. Nevertheless, the amounts of data which must be moved around are very sizable, and the computational and data-transfer burden of placing the correct data into the frame buffer can still be very large.

Even if the computational operations required are quite simple, they must be performed repeatedly on a large number of datapoints. For example, in a typical 1998 high-end configuration, a display of 1280×1024 elements may need to be refreshed at 72 Hz, with a color resolution of 24 or more bits per pixel. If blending is desired, additional bits (e.g. another 8 bits per pixel) will be required to store an "alpha" or transparency value for each pixel. This implies manipulation of more than 3 billion bits per second, without allowing for any of the actual computations being performed. Thus it may be seen that this is an environment with unique data manipulation requirements.

If the display is unchanging, no demand is placed on the rendering operations. However, some common operations (such as zooming or rotation) will require every object in the image space to be re-rendered. Slow rendering will make the rotation or zoom appear jerky. This is highly undesirable. Thus efficient rendering is an essential step in translating an image representation into the correct pixel values. This is particularly true in animation applications, where newly rendered updates to a computer graphics display must be generated at regular intervals.

The rendering requirements of three-dimensional graphics are particularly heavy. One reason for this is that, even after the three-dimensional model has been translated to a two-dimensional model, some computational tasks may be bequeathed to the rendering process. (For example, color values will need to be interpolated across a triangle or other primitive.) These computational tasks tend to burden the rendering process. Another reason is that since three-dimensional graphics are much more lifelike, users are more likely to demand a fully rendered image. (By contrast, in the two-dimensional images created e.g. by a GUI or simple game, users will learn not to expect all areas of the scene to be active or filled with information.)

FIG. 2 is a very high-level view of other processes performed in a 3D graphics computer system. A three dimensional image which is defined in some fixed 3D coordinate system (a "world" coordinate system) is transformed into a viewing volume (determined by a view position and direction), and the parts of the image which fall outside the viewing volume are discarded. The visible portion of the image volume is then projected onto a viewing plane, in accordance with the familiar rules of perspective. This produces a two-dimensional image, which is now mapped into device coordinates. It is important to understand that all of these operations occur prior to the operations performed by the rendering subsystem of the present invention. FIG. 3 is an expanded version of FIG. 2, and shows the flow of operations defined by the OpenGL standard.

A vast amount of engineering effort has been invested in computer graphics systems, and this area is one of increasing activity and demands. Numerous books have discussed the requirements of this area; see, e.g., ADVANCES IN COMPUTER GRAPHICS (ed. Enderle 1990-); Chellappa and Sawchuk, DIGITAL IMAGE PROCESSING AND ANALYSIS (1985); COMPUTER GRAPHICS HARDWARE (ed. Reghbati and Lee 1988); COMPUTER GRAPHICS: IMAGE SYNTHESIS (ed. Joy et al.); Foley et al., FUNDAMENTALS OF INTERACTIVE COMPUTER GRAPHICS (2.ed. 1984); Foley, COMPUTER GRAPHICS PRINCIPLES & PRACTICE (2.ed. 1990); Foley, INTRODUCTION TO COMPUTER GRAPHICS (1994); Giloi, Interactive Computer Graphics (1978); Hearn and Baker, COMPUTER GRAPHICS (2.ed. 1994); Hill, COMPUTER GRAPHICS (1990); Latham, DICTIONARY OF COMPUTER GRAPHICS (1991); Magnenat-Thalma, IMAGE SYNTHESIS THEORY & PRACTICE (1988); Newman and Sproull, PRINCIPLES OF INTERACTIVE COMPUTER GRAPHICS (2.ed. 1979); PICTURE ENGINEERING (ed. Fu and Kunii 1982); PICTURE PROCESSING & DIGITAL FILTERING (2.ed. Huang 1979); Prosise, HOW COMPUTER GRAPHICS WORK (1994); Rimmer, BIT MAPPED GRAPHICS (2.ed. 1993); Salmon, COMPUTER GRAPHICS SYSTEMS & CONCEPTS (1987); Schachter, COMPUTER IMAGE GENERATION (1990); Watt, THREE-DIMENSIONAL COMPUTER GRAPHICS (2.ed. 1994); Scott Whitman, MULTIPROCESSOR METHODS FOR COMPUTER GRAPHICS RENDERING; the SIGGRAPH PROCEEDINGS for the years 1980–1994; and the *IEEE Computer Graphics and Applications* magazine for the years 1990–1997; all of which are hereby incorporated by reference.

Background: Graphics Animation

In many areas of computer graphics a succession of slowly changing pictures are displayed rapidly one after the other, to give the impression of smooth movement, in much the same way as for cartoon animation. In general the higher the speed of the animation, the smoother (and better) the result.

When an application is generating animation images, it is normally necessary not only to draw each picture into the frame buffer, but also to first clear down the frame buffer, and to clear down auxiliary buffers such as depth (Z) buffers, stencil buffers, alpha buffers and others. A good treatment of the general principles may be found in *Computer Graphics: Principles and Practice,* James D. Foley et al., Reading MA: Addison-Wesley. A specific description of the various auxiliary buffers may be found in *The OpenGL Graphics System: A Specification* (Version 1.0), Mark Segal and Kurt Akeley, SGI.

In most applications the value written, when clearing any given buffer, is the same at every pixel location, though different values may be used in different auxiliary buffers. Thus the frame buffer is often cleared to the value which corresponds to black, while the depth (Z) buffer is typically cleared to a value corresponding to infinity.

The time taken to clear down the buffers is often a significant portion of the total time taken to draw a frame, so it is important to minimize it.

Background: Parallelism in Graphics Processing

Due to the large number of at least partially independent operations which are performed in rendering, many proposals have been made to use some form of parallel architecture for graphics (and particularly for rendering). See, for example, the special issue of *Computer Graphics* on parallel rendering (September 1994). Other approaches may be found in earlier patent filings by the assignee of the present application and its predecessors, e.g. U.S. Pat. No. 5,195,186, and published PCT applications PCT/GB90/00987, PCT/GB90/01209, PCT/GB90/01210, PCT/GB90/01212, PCT/GB90/01213, PCT/GB90/01214, PCT/GB90/01215, and PCT/GB90/01216, all of which are hereby incorporated by reference.

Background: Pipelined Processing Generally

There are several general approaches to parallel processing. One of the basic approaches to achieving parallelism in computer processing is a technique known as pipelining. In this technique the individual processors are, in effect, connected in series in an assembly-line configuration: one processor performs a first set of operations on one chunk of data, and then passes that chunk along to another processor which performs a second set of operations, while at the same time the first processor performs the first set operations again on another chunk of data. Such architectures are generally discussed in Kogge, THE ARCHITECTURE OF PIPELINED COMPUTERS (1981), which is hereby incorporated by reference.

Background: The OpenGL™ Standard

The "OpenGL" standard is a very important software standard for graphics applications. In any computer system which supports this standard, the operating system(s) and application software programs can make calls according to the OpenGL standards, without knowing exactly what the hardware configuration of the system is.

The OpenGL standard provides a complete library of low-level graphics manipulation commands, which can be used to implement three-dimensional graphics operations. This standard was originally based on the proprietary standards of Silicon Graphics, Inc., but was later transformed into an open standard. It is now becoming extremely important, not only in high-end graphics-intensive workstations, but also in high-end PCs. OpenGL is supported by Windows NT™, which makes it accessible to many PC applications.

The OpenGL specification provides some constraints on the sequence of operations. For instance, the color DDA operations must be performed before the texturing operations, which must be performed before the alpha operations. (A "DDA" or digital differential analyzer, is a conventional piece of hardware used to produce linear gradation of color (or other) values over an image area.)

Other graphics interfaces (or "APIs"), such as PHIGS or XGL, are also current as of 1995; but at the lowest level, OpenGL is a superset of most of these.

The OpenGL standard is described in the OPENGL PROGRAMMING GUIDE (1993), the OPENGL REFERENCE MANUAL (1993), and a book by Segal and Akeley (of SGI) entitled THE OPENGL GRAPHICS SYSTEM: A SPECIFICATION (Version 1.0), all of which are hereby incorporated by reference.

FIG. 3 is an expanded version of FIG. 2, and shows the flow of operations defined by the OpenGL standard. Note that the most basic model is carried in terms of vertices, and these vertices are then assembled into primitives (such as triangles, lines, etc.). After all manipulation of the primitives has been completed, the rendering operations will translate each primitive into a set of "fragments." (A fragment is the portion of a primitive which affects a single pixel.) Again, it should be noted that all operations above the block marked "Rasterization" would be performed by a host processor, or possibly by a "geometry engine" (i.e. a dedicated processor which performs rapid matrix multiplies and related data manipulations), but would normally not be performed by a dedicated rendering processor such as that of the presently preferred embodiment.

Background: Bit-Blit

Bit-blit, also written as bit blit and bitblt, is a pixel block copying procedure. The term "bitblt" is short form for "bit block transfer." One of the most common uses of the bit-blit is in copying pixels from the back framebuffer, where they were written by the graphics processor, to the front framebuffer, from where they will be scanned and displayed. Blitting is also used to simply move a block of pixels from one set of memory locations to another, which effectively moves those pixels on the display, e.g. scrolling of text or moving a window on the screen.

Background: Multiple High-Performance Graphics Processors

One method of increasing graphics throughput is to combine multiple graphics processors in one system, and to distribute the graphics processing between them. One common method of distributing graphics jobs between processors is to assign alternating scanlines (or alternating multiple-scanline "stripes") to each processor, then reading each framebuffer in turn in order to display the resulting data.

One problem with this sort of multiprocessor system arises when a bit blit is sought to be performed on a set of pixels which encompass more than one scanline. Because scanline boundaries are the common divisions between processors, this means that the blit operation may require the memories of multiple processors to be read from or written to. In particular, to maintain the ability to perform a logical operation concurrently with a bit-blit, both the source and destination memories must be read, and the destination memory must be then written to.

Innovative System and Preferred System Context

The present invention provides a new approach to these needs. In the preferred embodiment, each of the multiple processors is able to fully support multi-processor operation using only PCI read operations between processors. According to the innovative method described more fully below, each of the graphics processors performs its operations on its respective scanlines, and writes to its own framebuffer, but the need for writes from one processor to the framebuffer of another processor is eliminated.

This innovative multi-processor bit-blit system is presented, in the presently preferred embodiment, in the context of multiple 3Dlabs GLINT® pipelined graphics processors, many details of which may be found in other issued 3Dlabs patents, e.g. U.S. Pat. Nos. 5,701,111, 5,272,192, 5,594,854, 5,777,629, 5,798,770, 5,764,243, all of which are hereby incorporated by reference. The preferred embodiment provides a graphics processing chip which uses a deep pipeline of multiple asynchronous units, separated by FIFOs, to achieve a high net through-put in 3D rendering. Besides the output interface to the frame buffer, a separate interface is to a local buffer which can be used for data manipulation (such as Z-buffering). Preferably reads and writes to the local buffer are provided by separate stages of the pipeline. Preferably some of the individual units include parallel paths internally. Preferably some of the individual units are connected to look ahead by more than one stage, to keep the pipeline filled while minimizing the use of expensive deep FIFOs.

The graphics management chip provided by the presently preferred embodiment implements the low-level rasterizing functions of OpenGL, together with some additional functions which aid in management of two-dimensional rendering to serve the graphical user interface.

The message-passing architecture of the presently preferred embodiment provides a long pipeline, in which the individual stages of the pipeline operate asynchronously. To optimize performance, stages of the pipeline may have internally parallel structure. (However, this is a basically quite different processing paradigm from the parallel rendering environments being explored by other developers.)

Where possible, data is kept on chip (registered) between blocks. However, of course, memory access is sometimes necessary. Thus, although most of the blocks are two-port blocks, some are multi-port to permit memory access. FIFO buffering is typically used for interface between the blocks. In many cases, one-deep FIFO's can be used, with appropriate look-ahead connections for timing control. However, in other stages, significantly deeper FIFO's are used, to avoid "bubbles" in the pipeline and optimize processor utilization.

The overall architecture of this innovative chip is best viewed using the software paradigm of a message passing system. In this system all the processing blocks are connected in a long pipeline with communication with the adjacent blocks being done through message passing. Between each block there is a small amount of buffering, the size being specific to the local communications requirements and speed of the two blocks.

The message rate is variable and depends on the rendering mode. The messages do not propagate through the system at a fixed rate typical of a more traditional pipeline system. If the receiving block can not accept a message, because its input buffer is full, then the sending block stalls until space is available.

The message structure is fundamental to the whole system as the messages are used to control, synchronize and inform each block about the processing it is to undertake. Each message has two fields—a data field and a tag field. The data field will hold color information, coordinate information, local state information, etc. The tag field is used by each block to identify the message type so it knows how to act on it.

A particular advantage of this architecture is that it inherently provides a very high degree of design for testability. Moreover, this is achieved without adding any special diagnostic hardware paths or registers. By providing appropriate commands to the chip, any desired input can be sent to any block within the pipeline. Thus modifications to the architecture can be tested very rapidly, and debugging can rapidly pinpoint any faults which may be present.

A particular advantage of this architecture is that it permits a very efficient test strategy: each unit can be taken out of the message stream and tested in isolation. This is possible because the interactions are all though the messages, and each unit does not know or care where the messages come from. Thus testing software can generate streams of messages as stimulus, and can check the resulting messages coming out against what the specified behavioral model defines. The input and output timings are varied to force the internal states to run in a blocked or non-blocking modes to further increase the test coverage. Moreover, the test coverage can be ascertained (both at the C statement level in the simulator and at the VHDL level), so that the comprehensiveness of the tests is not an unknown.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
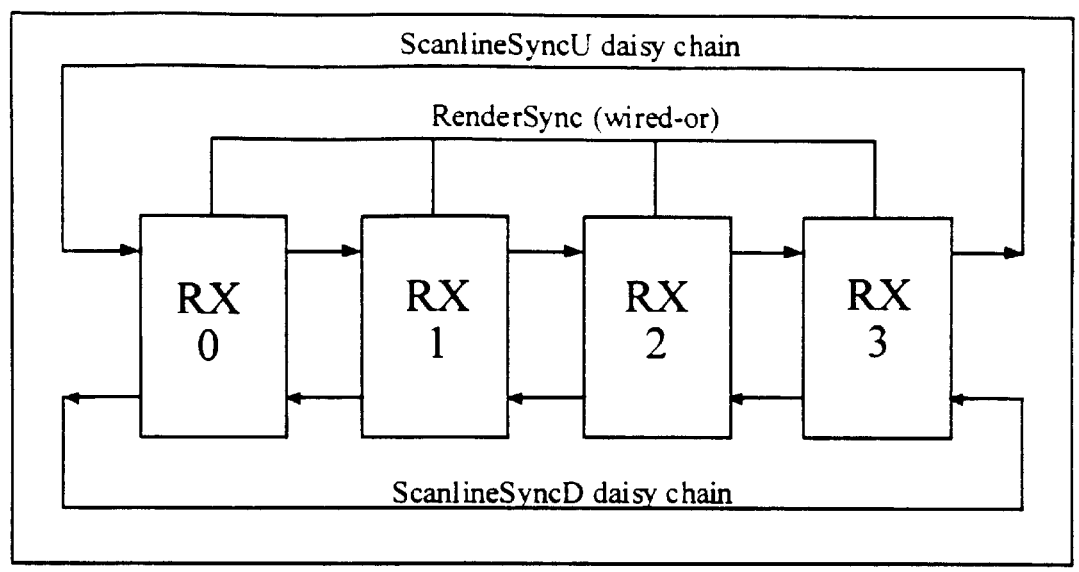
FIG. 1 shows an exemplary diagram of the connections between four 3D graphics processors.
Figure 2:
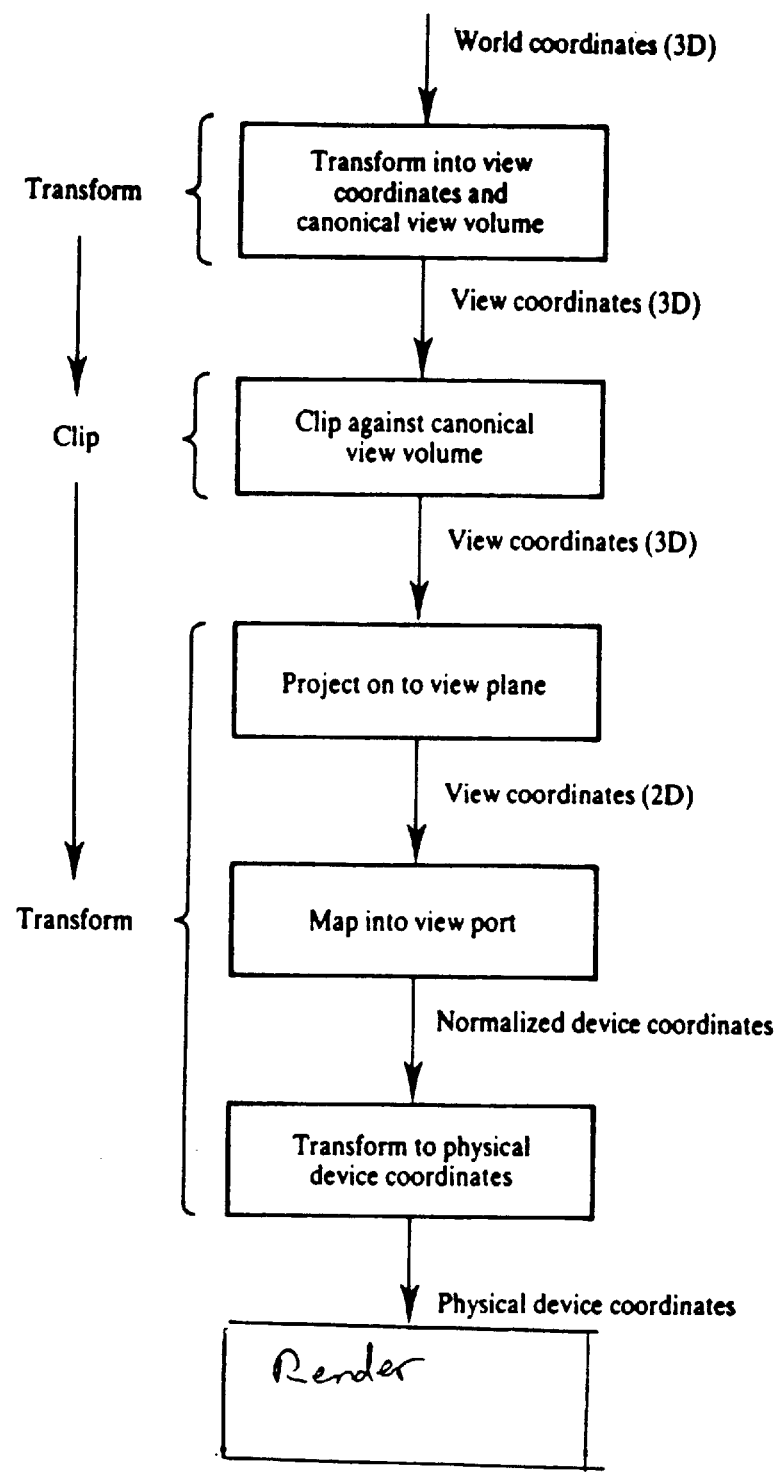
FIG. 2 is a very high-level view of other processes performed in a 3D graphics computer system.
Figure 3:
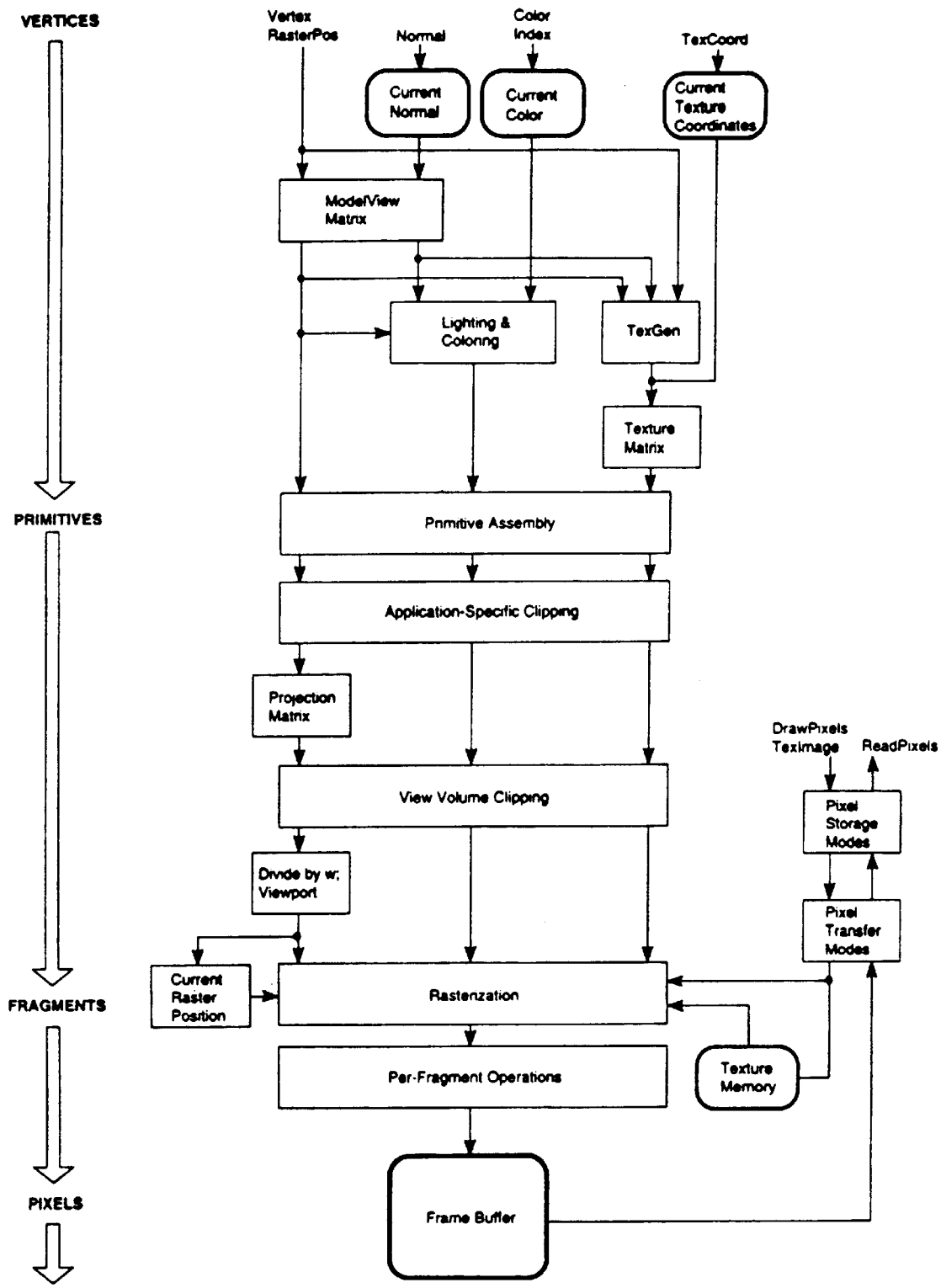
FIG. 3 is an expanded version of FIG. 2, and shows the flow of operations defined by the OpenGL standard.

The numerous innovative teachings of the present application will be described with particular reference to the presently preferred embodiment (by way of example, and not of limitation), in which:

According to the preferred embodiment, a computer system is provided which includes multiple graphics rendering processors which are connected to each other over a common system bus. While many details of the preferred system context are described above and below, the preferred system and method of performing bit-blit operations across multiple processors may be implemented in any number of graphics processing systems or computer systems.

In order to implement a bit-blit when the data to be moved crosses between multiple graphics processors in a computer system, two mechanisms to be put into place, as described below.

Data Sharing

The first basic requirement is, of course, that each processor be able to access the data in the memory of another processor. In the preferred embodiment, each processor has an independent memory system. Further, according to the preferred embodiment, data is divided between processors in on a scanline (or group of scanlines) basis.

Thus, according to the preferred embodiment, data sharing achieved by detecting when the pixel to be read is not one of the scanlines owned by this processor (the bottom bits of the Y coordinate readily show this). These bottom Y bits (1 for a dual RX system, 2 for a quad, etc.) then index into a table which give the base PCI address of this compressed framebuffer in the target processor. The actual pixel address is then easily calculated and read across the PCI bus. The addresses are streamed for efficient access. The PCI bus runs at 66 Mhz so a read rate of 150 MB/s should be easily achievable because the secondary PCI bus is a more controlled environment.

Further, by passing communications over the PCI bus, it is possible to bypass the host system entirely by utilizing a direct PCI data transfer. PCI, or Peripheral Component Interconnect, is a standard for interconnecting the peripherals, e.g. cards which are plugged into the motherboard) with both the system memory and the CPU of a computer system. Full technical details may be found in the PCI Local Bus Specification 2.1 (PCI SIG, 1995), which is hereby incorporated by reference. It was designed from the start to alleviate many of the headaches that installation of a new card into an ISA bus-based computer would cause (IRQ conflicts, address conflicts, etc.). All PCI standards are set by a committee to ensure wide industry support.

Synchronization

Synchronization is necessary on two counts: Firstly the blit cannot start until all the processors have finished rendering, otherwise data may be copied before it is updated with its final value. Secondly, the source and destination rectangles of the blit may overlap so the data must be copied in a controlled manner (and order) otherwise some data could be overwritten before it has been copied itself. Even if there is no overlap it is still advantageous to tightly control the blit to prevent all the processors from fighting for access to the PCI bus simultaneously.

In the preferred embodiment, the WaitForCompletion command is used to synchronize multiple processors. All of the processors are connected together by a RenderSync signal. This is best viewed as a wired-or connection so only when all processors drive this line low does it actually go low.

When the processors need to be synchronized at the end of some rendering (this can be used generally and not just for blits) the WaitForCompletion command is sent to all RX-s with the RenderSync bit set. When the rasterizer is given this command it waits for all outstanding memory accesses to finish (as normal) and then drives the RenderSync line low. It then sits there monitoring this line waiting for it to go low. The wired-OR nature of this line means that the processor will only see the line go low when all the processors have finished and consequently driven it low. One this state has been reached, the rasterizer drives the signal high (in preparation for the next time) and executes the next command.

Blit Sequencing

The blit is controlled on a stripe-by-stripe basis, where each stripe is one or more consecutive scanlines. The processor which owns the first destination scanline gets to go first and when it has finished this scanline it passes control to the next processor, which owns the next stripe, and so on. Control is passed from one processor to the next one in sequence by a dedicated signal. This signal (ScanlineSyncU) runs in a daisy chain form one processor to the next and then ultimately back to the first. This signal is used to pass control from Processor0 (which owns stripe 0) to Processor1 to Processor2, etc. A similar signal (ScanlineSyncD) passes control in the opposite direction. This is necessary because the blit may need to process from top to bottom or bottom to top depending on how the source and destinations overlap. This synchronization takes 4 unidirectional pins or two bi-directional pins. FIG. 1 shows an exemplary diagram of the connections between four 3D graphics processors.

To determine the direction in which the processing moves between processors, the data to be processed is examined. In order to minimize any possible write-before-read conflicts, each primitive is processed bottom-to-top or top-to-bottom so that as control is passed between processors, all data is updated before it is read. For this reason, it is advantageous to selectively use the ScanlineSyncU and ScanlineSyncD signals.

Memory Interface

In the preferred embodiment, the FB (framebuffer) Read Unit is connected to the Memory Controller, which is in turn connected to two Memory Interfaces. The two memory interfaces have the same interface specification, but differ slightly. The bus width in the LB (localbuffer) Memory can be 160 bits, versus the 128 bits for the FB memory. The FB Read Unit only deals in 128 bits, so the LB Memory Interface ignores any extra data bits when passing the result back to this unit.

A FIFO is used to pass the following information to the Memory Controller:

| Bit No. | Name | Width | Description |
|---|---|---|---|
| 0 . . . 1 | Type | 2 | Indicates what the target memory is, where<br>0 = FB Memory<br>1 = LB Memory<br>2 = PCI |
| 2 | ReadCmd | 1 | An encoded bit field which specifies the required read or control action. |
| 3 . . . 30 | Addr | 28 | The read address of the 128 bits of memory data |

The following information is passed back from the Memory Controller in a FIFO:

| Bit No. | Name | Width | Description |
|---|---|---|---|
| 0 . . . 127 | Data | 128 | The data to be read from the memory. |

The ReadCmd is defined as follows:

| Value | Name | Action |
|---|---|---|
| 0 | ReadData | The address in the addr field is read. The data will be returned an unspecified time later via the data FIFO |
| 1 | SuspendReads | Causes the memory interface to suspend reading on the associated memory port. Reading is resumed once all write requests for this port have been satisfied. The address field is zero. |

PCI Mapping

The PCI MappingEnable, when set, converts any fragment reads with a Y coordinate which indicates that the required scanline belongs to another processor, to reads across the PCI bus. The framebuffers from each processor are not necessarily physically contiguous in memory so once the target processor has been identified the base address of this framebuffer is looked up and used instead of a local addressing mode.

Note that while write across a PCI bus are generally more efficient than reads, this approach doesn't work when the source data is to be blended or to undergo a logical operation with the destination data. Therefore, in the preferred embodiment, although it might appear to be more efficient to rasterize the source pixels and write them to the destination framebuffer across the PCI bus, it is actually advantageous to implement the preferred technique of performing only reads across the PCI bus. If the slave PCI implements read-ahead, then the read can be made effectively as fast as writes.

Sustained burst read across the PCI bus is essential to give the desired performance. To support this, the preferred embodiment provides two particular functions:

The PCI master checks addresses from the core and maintains the read burst as long as the addresses remain sequential and arrive in time.

The PCI slave reads ahead so the next memory word (128 bits) is already available before it is actually needed. This allows it to keep up with delivering a new word every cycle.

Therefore, each processor, as it in turn becomes the "active" processor, will perform any necessary reads across the PCI bus from the other processor(s), and will then perform the write, as well as any logical operation or alpha blending operation, locally. This avoids the overhead of having to perform both a read and a write over the PCI bus when performing a logical operation with the blit. In alternate embodiments, both the read and write to other processors' memory are supported.

FIG. 4 shows a block diagram representation of the processors with a common bus connection 402. Connected to communicate with the processors is synchronization logic 404.

Scanline "Stripes"

In the preferred embodiment, the traditional method of scanline interleaving has been extended to improve performance and assist in blits where the source and destination pixels are in different processors.

In the preferred embodiment, each processor can now "own" a group of consecutive scanlines (a "stripe") and the stripes are interleaved. In the simplest case, a stripe can be a single scanline high, which would behave functionally as traditional scanline interleave. In the present embodiment, stripes can be 1, 2, 4, 8, or 16 scanlines high.

Stripes provide several advantages, such as increasing cache coherency for texture mapping and reducing time required for rasterization or setup calculations when a primitive doesn't intersect a given stripe at all.

According to a disclosed class of innovative embodiments, there is provided: A graphics processing system, comprising at least two processors, each having its own memory, connected to a common system bus; sequencing logic to allow each processor to process some portion of data in sequence, and then to pass processing control to a succeeding processor; wherein when a given processor is required to perform an operation on data stored in the memory of another processor, the memory of said other processor is read over said system bus, and said operation is performed and the result of said operation is stored in said given processor.

According to another disclosed class of innovative embodiments, there is provided: A computer graphics system, comprising: a motherboard, having memory, input/output logic, and at least one system bus for connecting additional hardware; a processor connected to said motherboard; at least one storage device operatively connected to said motherboard; at least two graphics processors, each having its own memory, connected to said system bus; sequencing logic to allow each graphics processor to process some portion of data in sequence, and then to pass processing control to a succeeding graphics processor; and a display system operatively connected to display data the has been processed by said graphics processors; wherein when a given graphics processor is required to perform an operation on data stored in the memory of another graphics processor, the memory of said other graphics processor is read over said system bus, and said operation is performed and the result of said operation is stored in said given processor.

According to another disclosed class of innovative embodiments, there is provided a method for rendering in a computer system, comprising the steps of: allocating data to be rendered between multiple graphics processors; processing said data in each processor in sequence; when processing in a given processor requires data in a memory of another processor, then reading data from said other processor, into said given processor, over a system bus; and performing an operation on said read data in said given processor and storing the result in said given processor.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

In particular, while the preferred embodiment is a 3Dlabs GLINT RX, the claimed embodiments and innovative features are applicable to any number of processors. In fact, the disclosed techniques are not limited to graphics processors at all, but may be used in any number of multiple-processor configurations where inter-processor access to different memories is required. While the preferred embodiment is described as operating over a PCI bus, of course other buses could be used as well.

While the preferred embodiment describes both input and output pairs of sequencing signals (ScanlineSyncU and ScanlineSyncD), the function of these lines could clearly be accomplished using a single pair of tristated signals or by other means.

While the preferred embodiment has been described in terms of up to four linked processors, there is of course no limit to the number of processors which can be linked to share the processing task. In fact, it is clearly possible that while some processors are performing the divided processing according to the preferred embodiment, other processors continue to process other data in parallel or otherwise.

Further, while the preferred embodiment has been described in terms of a scanline (or multiple scanline) division of the data to be processed, the data may in fact be divided between the processors in any number of ways, and in particular according to two-dimensional divisions of the display area.

What is claimed is:

1. A graphics processing system, comprising:
at least two processors, each having its own memory, connected to a common system bus;
sequencing logic to allow each processor to process some portion of data in sequence, and then to pass processing control to a succeeding processor;
wherein when a given processor is required to perform an operation on data stored in the memory of another processor, the memory of said other processor is read over said system bus, and said operation is performed and the result of said operation is stored in said given processor;

wherein writes across the system bus are not used by said at least two processors.

2. The system of claim 1, wherein said processors are graphics processors.

3. The system of claim 1, wherein said processors are GLINT graphics processors.

4. The system of claim 1, wherein said data is graphics data.

5. The system of claim 1, wherein said system bus is a PCI bus.

6. The system of claim 1, wherein said operation is a blit operation.

7. The system of claim 1, wherein said operation is a blit-with-logical-operation.

8. The system of claim 1, wherein said operation is a blit-with-alpha-blend operation.

9. The system of claim 1, wherein said sequencing logic includes sequencing signals which connect each processor to a preceding and succeeding processor.

10. The system of claim 1, wherein said processors are synchronized before said reading of memory is performed.

11. The system of claim 1, further comprising means to write said data to a display when processing is complete.

12. The system of claim 1, wherein said data is divided between said processors on a multiple-scanline basis.

13. A computer graphics system, comprising:

a motherboard, having memory, input/output logic, and at least one system bus for connecting additional hardware;

a processor connected to said motherboard;

at least one storage device operatively connected to said motherboard;

at least two graphics processors, each having its own memory, connected to said system bus;

sequencing logic to allow each graphics processor to process some portion of data in sequence, and then to pass processing control to a succeeding graphics processor; and a display system operatively connected to display data the has been processed by said graphics processors;

wherein when a given graphics processor is required to perform an operation on data stored in the memory of another graphics processor, the memory of said other graphics processor is read over said system bus, and said operation is performed and the result of said operation is stored in said given processor;

wherein writes across the system bus are not used by said at least two processors.

14. A method for rendering in a computer system, comprising the steps of:

(a.) allocating data to be rendered between multiple graphics processors;

(b.) processing said data in each processor in sequence;

(c.) when processing in a given processor requires data in a memory of another processor, then (i.) reading data from said other processor, into said given processor, over a system bus; and (ii.) performing an operation on said read data in said given processor and storing the result in said given processor;

wherein writes across the system bus are not used by said multiple graphics processors.

15. The method of claim 14, wherein said processors are GLINT graphics processors.

16. The method of claim 14, wherein said data is graphics data.

17. The method of claim 14, wherein said system bus is a PCI bus.

18. The method of claim 14, wherein said operation is a blit operation.

19. The method of claim 14, wherein said operation is a blit-with-logical-operation.

20. The method of claim 14, wherein said operation is a blit-with-alpha-blend operation.

21. The method of claim 14, wherein said processors are synchronized before said reading of memory is performed.

22. The method of claim 14, wherein said data is written to a display when processing is complete.

23. The method of claim 14, wherein said data is divided between said processors on a multiple-scanline basis.

* * * * *